(12) United States Patent
Hammonds

(10) Patent No.: US 6,544,414 B2
(45) Date of Patent: Apr. 8, 2003

(54) EROSION FEEDER ATMOSPHERE STABILIZER AND METHOD

(75) Inventor: Carl L. Hammonds, Humble, TX (US)

(73) Assignee: Hammonds Technical Services Inc., Houston, TX (US)

(*) Notice: Subject to any disclaimer, the term of this patent is extended or adjusted under 35 U.S.C. 154(b) by 0 days.

(21) Appl. No.: 09/970,132

(22) Filed: Oct. 3, 2001

(65) Prior Publication Data

US 2002/0040878 A1 Apr. 11, 2002

Related U.S. Application Data

(60) Provisional application No. 60/238,322, filed on Oct. 5, 2000.

(51) Int. Cl.[7] .............................. C02F 1/50; C02F 1/76; E04H 4/16
(52) U.S. Cl. ..................... 210/198.1; 210/205; 137/268; 422/264; 422/266; 422/272; 422/274; 422/278
(58) Field of Search ............................... 210/198.1, 205; 137/268; 422/261, 264, 266, 272, 274, 278

(56) References Cited

U.S. PATENT DOCUMENTS

| 5,201,339 | A | * | 4/1993 | Buchan et al. |
| 5,384,102 | A | | 1/1995 | Ferguson et al. |
| 5,743,287 | A | * | 4/1998 | Rauchwerger |
| 6,138,703 | A | * | 10/2000 | Ferguson et al. |
| 6,337,024 | B1 | * | 1/2002 | Hammonds |

* cited by examiner

Primary Examiner—Thomas M. Lithgow
(74) Attorney, Agent, or Firm—Gary L. Bush; Andrews & Kurth, LLP

(57) ABSTRACT

An apparatus and method for stabilizing and preserving water soluble solid chemical used in erosion feeders for sanitizing water. Outside ambient air is forced through the chemical stored in a feeder chamber. Depending on the temperature of outside ambient air, the air may be heated before being introduced into the feeder.

13 Claims, 1 Drawing Sheet

EROSION FEEDER ATMOSPHERE STABILIZER AND METHOD

CROSS-REFERENCE TO RELATED APPLICATION

This application claims priority from U.S. provisional application 60/238,322 filed on Oct. 5, 2000.

BACKGROUND OF THE INVENTION

1. Field of the Invention

This invention relates generally to water-soluble chemical feeders where the chemical from the feeder is eroded by water so as to produce a sanitizing solution of dissolved chemical and water. In particular, the invention relates to an apparatus and method for reducing moisture in the atmosphere inside the storage hopper for a chemical tablet feeder.

2. Description of Prior Art

Water-soluble chemicals in water sanitizing devices (also known as "chlorinators") have a problem with moisture in the storage chamber softening the chemical tablets in at least two uncontrolled ways. The first concerns condensation forming within the hopper. The second concerns a humid atmosphere within the hopper and the chemical tablets "wicking" of the water vapor from the air.

Since water or other dissolving liquids are used to erode chemical tablets of a water sanitizing unit, the atmosphere within the hopper or chamber that stores such tablets tends to be moist, and particularly when the ambient temperature outside the storage chamber is low, condensation can form on the interior walls of the chamber. Such condensation can soften tablets in the hopper in a non-controlled fashion.

In operation, a storage chamber does not fill completely with water, but rather water contacts only the bottom layer of tablets during the erosion process. When the system is not operating, the water drains from contact with the tablets into a collection reservoir and/or to a mixing chamber below the tablets. Even when water is not flowing through the water sanitizing unit, a residual amount of water remains within the mixing chamber that is below the level of tablets. It is this water that tends to evaporate and cause the atmosphere within the chamber to become water-laden, that is humid. Since the tablets are stored in a hopper above the mixing chamber in such an environment for several days, they tend to "wick" the moisture from the water-laden air within the chamber and slowly become softer from the absorption process. This "wicking" or softening of the tablet changes the rate at which the tablet erodes into solution when water is applied to the surface of the tablet during operation.

Feeders that are typically used to erode solid calcium hypochlorite or other disinfection chemicals such as bromines, dichlorisocyanurates and trichlorisocyanurates for the purpose of disinfecting water, must maintain substantially a constant level of dissolution in order to maintain the proper residual level of dissolved chemistry within the process stream. Tablets that have become soft or moisture saturated erode at varying rates, thereby making the control of proper chemical residuals difficult or even impossible. Even the slightest change in tablet consistency and erosion characteristics alters the stability of the final chemical solution from the feeder.

Another problem with this type of feeder is that the softening of the tablets can often cause the tablets to stick together or to the sides of the storage chamber. This process is commonly called "bridging", because the tablets form a bridge that supports the remaining tablets above the bridged area, thereby preventing the tablets from moving by gravity into the lowest portion of the feeder as the erosion process continues. The lowest portion of the feeder is where the tablets are eroded by water flowing over them. When a "bridge" of tablets forms, and all the tablets below such a bridge have been eroded away, there is no longer any tablet being placed into solution and therefore the consistent delivery of the feeder is interrupted. Even the slightest interruption of output from the feeder can cause the residual chemical within the process to vary. In the case of public drinking water or in water used for swimming pools, these minor changes in chemical residual can cause a health hazard to people consuming or using the water.

Identification of Objects of the Invention

A primary object of the invention is to provide an apparatus and method for a chemical tablet water-sanitizing unit in which tablets or "pillows" or other solid geometric shapes erode at a consistent rate.

Another object of the invention is to provide an apparatus and method in a water-sanitizing unit that allows tablets to remain stable throughout the period in which they are stored awaiting the erosion process.

Another object of the invention is to provide a device which provides stability and consistency of the atmosphere and temperature within the storage or erosion container of a water-sanitizing unit.

SUMMARY OF THE INVENTION

The objects identified above, as well as other advantages and features are incorporated in a system that forces outside, ambient air through the inside of the tablet storage or erosion chamber of a typical tablet erosion feeder. In some cases, depending on the temperature of the outside ambient air, a heating element is provided to raise the temperature of the air being introduced to the chamber. The amount of air being introduced is extremely small, great enough only to maintain a positive pressure inside the chamber, causing the air inside the chamber to constantly flow through it to outside air. This constant movement of fresh outside air through the chemical tablets prevents condensation from forming within the chamber that is sufficient to degrade the tablets.

In most cases, simply balancing the air on the inside of the chamber with air from outside the chamber and maintaining that process with a slow but constant pressure is sufficient to prevent the formation of condensation within the chamber, and to lower the relative humidity inside the storage chamber, thus slowing or eliminating the "wicking" of moisture by the tablets. In cases where the outside air is very moist and cold such as during the winter months, a thermostat is used to measure the temperature of the fresh outside air being drawn into the system. When the temperature reaches a certain level, such as below 40° F., either a small light bulb or electrical heat strip or the like is activated that is sufficient to both dry the incoming air and raise the temperature of the air being delivered to the tablet storage or erosion area. This drying of the air and raising the temperature of air within the storage chamber inhibits if not completely eliminates formation of condensation within the storage chamber and reduces wicking of moisture from the air by the tablets. As a result, the physical structure of the chemical tablets is stabilized and bridging and sticking of the tablets to each other and the walls of the feeder is largely prevented.

DESCRIPTION OF THE PREFERRED EMBODIMENT OF THE INVENTION

Figure 1:
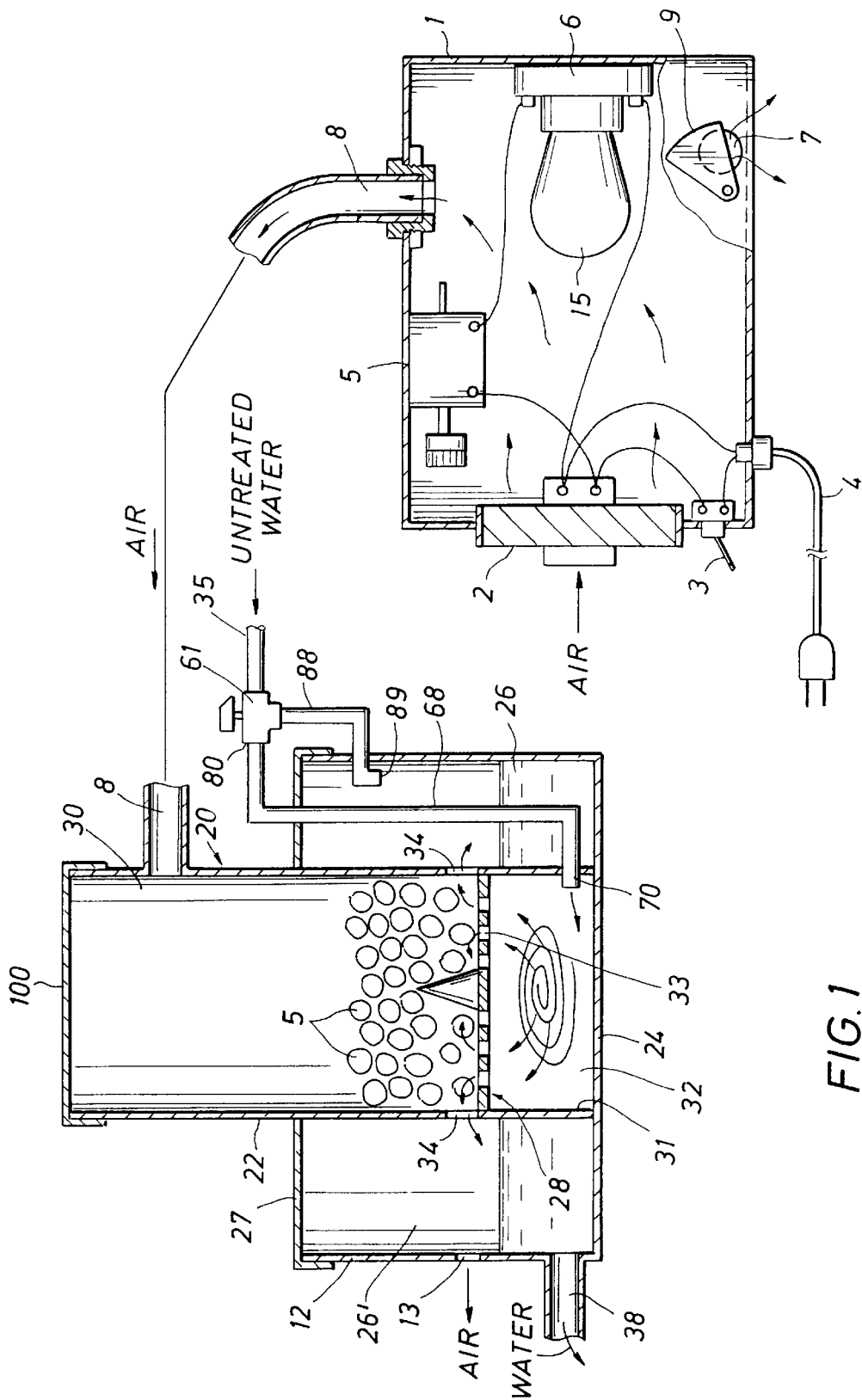
FIG. 1 is a schematic illustration of the parts of the apparatus for preventing excessive moisture laden atmosphere in a storage hopper of a chemical tablet sanitizing system. The method of the invention is also illustrated in the FIGURE.

FIG. 1 illustrates the apparatus of the invention which includes an arrangement for dissolving solid chemical in a water stream for sanitizing the water. Several arrangements of a canister or storage chamber (or "hopper"), mixing chamber, and collection reservoir are described in pending U.S. application Ser. No. 09/616,149, filed Jul. 13, 2000, said application being incorporated by reference herein for all purposes.

The apparatus of FIG. 1 is sometimes called a "chlorinator" because often the solid chemical to be dissolved into the water stream is chlorine, but as described above, the term chlorinator in this description of the invention is defined to be an apparatus for the controlled erosion of solid tablets or the like of calcium hypochlorite or other disinfecting chemicals such as bromines, dichlorisocyanurates and trichlorisocyanurates. In general, the apparatus of FIG. 1 is called a "water sanitizing unit." In a preferred arrangement of FIG. 1, a container 20 is provided with side walls 22. The container, preferably a cylinder with a round cross-section, is designed to hold chemical tablets 5. A lid 100 closes the top of the container 20. The container 20 is divided into an upper chamber 30 and a lower or mixing chamber 32 by means of the grid or "sieve plate" 28 which is supported from the side walls 22. The container is supported within the housing 12 by resting on the bottom 24 of the housing 12. The container 20 is not affixed to the bottom 24 of the housing 12. In other words, there is no need to completely isolate the bottom of the mixing chamber 32 from the collection reservoir 26. As illustrated in the above mentioned U.S. patent application Ser. No. 09/616,149, it may be placed on a dish at the bottom 24 with holes in the dish to allow sediments to be trapped at the bottom 24. The housing 12 may be a circular or rectangular cylinder or enclosure.

The housing 12 includes a lid 27 connected to the side walls 22 of the upper chamber 30 of the container 20. A collection reservoir 26 is defined in the housing cavity by walls 12 and base 24 of housing 12 and radially outwardly of side walls 22 of the container 20. Radial holes 34 are preferably placed in the side walls 22 of container 20 at a position above the level of liquid of the collection reservoir 26.

A flow stream of water enters via pipe 35 to a three way valve 61. Water via pipe 68 from valve 61 is applied tangentially to the mixing chamber 32 so as to create a circular movement of the water in chamber 32 that has sufficient energy to raise the level of water in a vortex through the grid 28. The vortex resembles a hollow cylinder of water with water rotating tangentially with respect to walls 31 of the chamber 32. Water from the vortex enters the grid 28 from radially outer perforation holes 28 in the grid and impinges on the lower level of chemical tablets 5 stacked thereon within upper chamber 30 of cylinder or container 20. Water returns to the mixing chamber 32 via radially inner holes in the grid 33.

Control of the height of the vortex of liquid of the lower mixing chamber 32, and the quantity of water passing over and impinging on the chemical tablets 5 is accomplished by means of three way valve 61 which diverts a portion of the incoming untreated liquid from pipe 35 via a diverting line 88 to an outlet 89 to collection chamber 26. With the circulation of fluid up through the perforated shelf and impinging contact with the chemical tablets 5, a portion of the fluid carrying dissolved chemical passes back into the mixing chamber 32 below the perforated shelf 28 to be part of the treating water. A portion of the treating water continues to recirculate and be mixed with incoming untreated water via pipe 68. Another portion of the treating solution is output via radial holes 34 in side walls 22 of container 20. Treated liquid from collection reservoir 26 is output via outlet 38 by gravity flow or by means of a pump for pressurized system application. Water-laden air is in space 26' above water level in the collection reservoir 26. A fluid flow path for both water and water-laden air exists via holes 34 between collection reservoir 26 and storage chamber 20. A fluid flow path also exists for both water and water-laden air also exists via holes 28 between mixing chamber 32 and storage chamber 20.

The apparatus of FIG. 1 includes an air conduit 8 which fluidly communicates between the chemical storage chamber 30 and an air control enclosure or box 1. Box 1 includes a low volume, low pressure axial electric fan 2 mounted on a wall of the enclosure. Electric current via power cord 4 is brought into the box and controlled by switch 3 where it is applied by electrical leads to fan 2 and in parallel to a series connection of a thermostat 5 and light bulb 15. Thermostat 5 is adjustable to actuate light bulb 15 or other heating element (such as a resistance strip) when the temperature falls below a specific temperature. Bulb 15 (mounted at 6 to a wall of enclosure 1) or a similar heating element is not always activated, but is turned on only when the outside ambient temperature falls below a specific set point. Outside air entering the fan 2 and the enclosure 1 is either heated or not (depending on the setting of thermostat 5) and then forced out through conduit 8 where it is applied to the storage chamber 30 or feeder that holds the chemical tablets 5.

The air within the feeder or canister 30 is displaced by the forced air from the conduit 8 and passes down through radial holes 34 (or via a pipe or the like) and into the space 26' above the reservoir fluid 26 and then outside the housing 12 via a discharge hole 13.

Adjustable vent port 7 in housing 1 is used to partially divert some of the air generated by fan 2 in cases where the size or volume of canister 30 requires less positive pressure in order to maintain a dry, reduced atmosphere. Adjustable cover 9 provides adjustability to the opening 7.

The system operates at all times maintaining a positive pressure within canister 30 and associated tanks and lines. The volume of air actually transmitted through conduit 8 to canister 30 is small. In cases where a high concentration of chlorine or other chemistry is detected at the discharge point 13 of the system, a charcoal filter (not shown) placed about the opening 13 is used to reduce the amount of chemical vapor emission to atmosphere.

Features and Advantages of the Invention

1. The arrangement as illustrated by FIG. 1 uses an amount of air which provides a differential air pressure within a storage container of solid chemical tablets causing outside air to flow through the container thereby equalizing the temperature inside and outside the container.

2. The arrangement as illustrated by FIG. 1 has the capability of applying heated air across chemical tablets in a container for sanitizing water, thereby reducing the relative humidity of the air within the chamber. As a result, the tablets are dried not only by passing a large volume of air over them, but also the relative moisture content of the atmosphere within the storage area in the presence of water is reduced so that the solid tablets do not tend to absorb the moisture.

What is claimed is:

1. Apparatus for delivering a solution of solid chemical material comprising,
   a storage chamber (30) arranged and designed to hold a stack of water soluble chemical tablets of solid chemical, said storage chamber having a lid (100),
   an enclosure (12) with a liquid collection reservoir (26) below said stack of water soluble chemical tablets, said storage chamber (30) and said enclosure (12) having a fluid path (34) in a lower portion of said chamber (30),
   a blower (2) fluidly connected to said storage chamber (30) at an upper portion of said chamber, and wherein, said liquid collection reservoir (26) is formed in the bottom of said enclosure (12), said enclosure (12) having a water outlet (38) at the bottom of said housing and an air outlet (13) disposed above water level in said liquid collection reservoir (26),
   whereby said blower forces outside air from the upper portion of said chamber, through said stack of water soluble chemical tablets, and through said fluid path in said lower portion of said chamber and to outside said enclosure thereby inhibiting condensation on the walls of the storage chamber and decreasing wicking of moisture from water-laden air by said tablets within said chamber.

2. The apparatus of claim 1 wherein
   said blower is mounted in an enclosure (1), said enclosure (1) having an air outlet, said apparatus further including
   a conduit (8) fluidly connecting an inlet at said upper portion of said chamber (30) and said air outlet of said enclosure (1).

3. Apparatus for delivering a solution of solid chemical material comprising,
   a storage chamber (30) arranged and designed to hold a stack of water soluble chemical tablets of solid chemical, said storage chamber having a lid (100),
   an enclosure (12) with a liquid collection reservoir (26) below said stack of water soluble chemical tablets, said storage chamber (30) and said enclosure (12) having a fluid path (34) in a lower portion of said chamber (30),
   a blower (2) fluidly connected to said storage chamber (30) at an upper portion of said chamber,
   whereby said blower forces outside air from the upper portion of said chamber, through said stack of water soluble chemical tablets, and through said fluid path in said lower portion of said chamber and to outside said enclosure thereby inhibiting condensation on the walls of the storage chamber and decreasing wicking of moisture from water-laden air by said tablets within said chamber wherein,
      said blower is mounted in an enclosure (1), said enclosure (1) having an air outlet, said apparatus further including
         a conduit (8) fluidly connecting an inlet at said upper portion of said chamber (30) and said air outlet of said enclosure (1), wherein,
            a heating element (15) is disposed in said enclosure (1), whereby air is heated before being forced to said air outlet, whereby the relative humidity of the air within the storage chamber (30) is reduced.

4. The apparatus of claim 3 wherein
   a thermostat (5) is electrically connected to said heating element (15), whereby said heating element is activated when the temperature of air within said enclosure (1) falls below a specified temperature.

5. The apparatus of claim 4 wherein
   said thermostat (5) is adjustable in order to specify a temperature below which said heating element is activated.

6. The apparatus of claim 3 wherein
   said heating element is a light bulb.

7. The apparatus of claim 3 wherein
   said heating element is a heating strip.

8. In a chlorinator having a storage chamber (30) which holds a stack of water soluble chemical material (5), a lid (100) on the top of said storage chamber, and an enclosure (12) with a liquid collection reservoir (26) below said stack with a fluid flow path between said enclosure and said stack of water soluble chemical tablets with an arrangement (68, 32, 28) designed for dissolving chemical in a lower portion of said stack with said dissolved chemical primarily entering said collection reservoir via said fluid flow path, characterized by
   a blower (2) fluidly connected to said storage chamber, and
   a hole (13) provided in said enclosure (12) whereby air forced from said blower through said storage chamber (30) to said enclosure (12) passes to atmosphere outside said chlorinator,
   whereby said blower forces outside air through said stack of water soluble chemical to atmosphere.

9. The apparatus of claim 8 wherein
   said blower (2) is mounted in an enclosure (1), said enclosure (10) having an air outlet, said apparatus further including
   a conduit (8) fluidly connecting an inlet at said upper portion of said chamber and said air outlet of said enclosure.

10. The apparatus of claim 9 wherein
    a heating element is disposed in said enclosure, whereby air is heated before being forced to said air outlet, whereby the relative humidity of the air within the storage chamber is reduced.

11. In a chlorinator having a storage chamber which holds a stack of water soluble chemical material (5), a lid (100) on the top of said storage chamber, and an enclosure (12) with a liquid collection reservoir (26) below said stack with a fluid flow path between said enclosure and said stack of water soluble chemical tablets with an arrangement (68, 32, 28) designed for dissolving chemical in a lower portion of said stack with said dissolved chemical entering said collection reservoir (26) via said fluid flow path, characterized by
    a method to inhibit said water soluble chemical material in said storage chamber from absorbing water from air within said storage chamber or from condensation on storage chamber walls, comprising the steps of
       forcing air from outside said chamber through said stack of chemical material and to said enclosure and providing an air outlet in said enclosure whereby air forced through said chamber is forced to outside atmosphere via said air outlet.

12. The method of claim 11 further comprising the step of heating said air before it is forced through said chamber to said enclosure.

13. The method of claim 11 whereby
    said air is forced from a portion above said stack of chemical material and via said fluid flow path to said enclosure.

\* \* \* \* \*